M. CLARK & C. A. HECKEL.
Corn-Stalk Cutter.

No. 199,691. Patented Jan. 29, 1878.

WITNESSES:
Theo. Coleman
Chas W Fletcher

INVENTORS:
Milton Clark
Charles A. Heckel
per Chas P. Housum
Atty.

UNITED STATES PATENT OFFICE.

MILTON CLARK AND CHARLES A. HECKEL, OF DECATUR, ILLINOIS.

IMPROVEMENT IN CORN-STALK CUTTERS.

Specification forming part of Letters Patent No. 199,691, dated January 29, 1878; application filed November 15, 1877.

*To all whom it may concern:*

Be it known that we, MILTON CLARK and CHARLES A. HECKEL, of Decatur, in the county of Macon and State of Illinois, have invented a new and useful Improvement in Corn-Stalk Cutters, which improvement is fully set forth in the following specification, reference being had to the accompanying drawings, in which—

Figure 1:
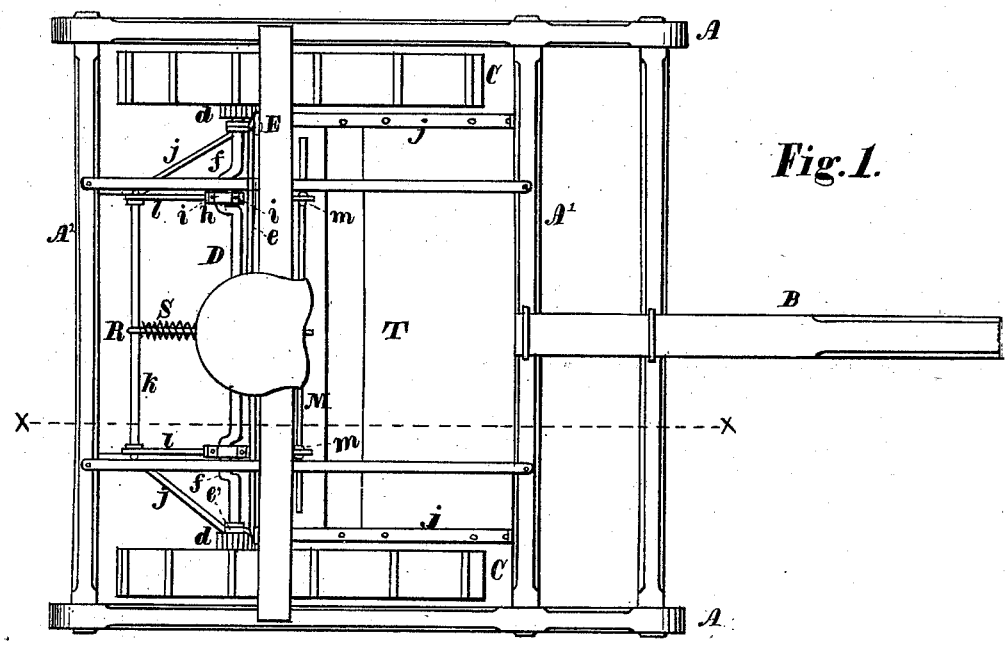
Figure 2:
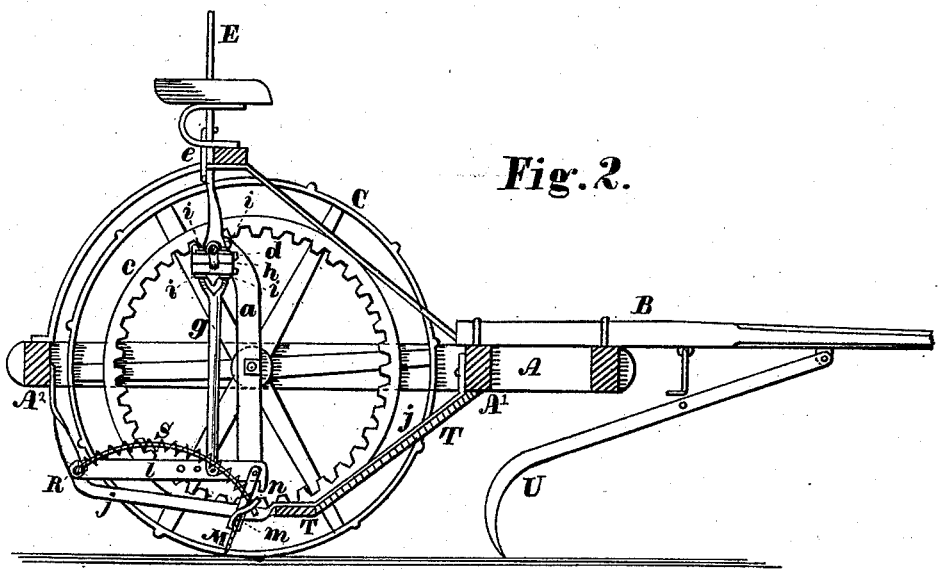

Figure 1 is a plan of a machine embodying our invention; and Fig. 2 is a vertical transverse section on the dotted line $x\ x$, Fig. 1.

The object of our invention is, first, to give the reciprocating knife a draw cut; second, in the arrangement of a spring in combination with the reciprocating knife, so as to allow the knife to swing backward directly after the cutting and before rising, and avoiding the scraping of the knife on the ground, the spring returning the knife to the proper position for the succeeding cut; and, third, in the form of the breaker in front of the knife, to break and press the stalks to the ground.

$A\ A^1\ A^2$ are, respectively, the side, front, and rear bars of the supporting-frame. B is the tongue. The driving-wheels C C revolve on stationary axles supported in the side bars A and upright braces $a$. The driving-wheels each have an internally-cogged rim, $c$, formed on or attached to them; or one cogged rim may answer. D is a crank rod or shaft, journaled in the upright braces $a\ a$, and carrying the pinions $d\ d$. These pinions can be thrown out of gear by means of the lever E and connecting-rods $e\ e'$, or any other connecting or disconnecting apparatus used for throwing cogged gearing into or out of mesh. To the cranks $f\ f$ on the crank-rod D are connected the ends of the pitman or connecting rods $g\ g$. These rods are bifurcated, and have divided journals $h\ h$, so arranged as to be raised, lowered, and secured by means of the nuts $i\ i$, to vary the depth of the cut of the knife.

$j\ j$ are braces, bent as shown, and secured to the rear bar $A^2$ and front bar $A^1$. $k$ is a rod connecting these braces. $l\ l$ are bars pivoted on rod $k$, and also to the pitmen. Several adjustments may be made of the pitmen by the holes in these bars to vary the throw of the knife. M is the knife, pivoted to the bars $l\ l$ by the rods $m\ m$. $n\ n$ are projections on the end of the bars $l\ l$, to prevent the knife swinging forward beyond a perpendicular line. R is a curved rod secured to the rod $k$, and passing through an eye in the knife. A spring, S, on this rod presses the knife into a perpendicular position as the knife is raised from the ground. T is the breaker, composed of two pieces, secured to the braces $j\ j$. The lower piece is horizontal and directly in front of the knife, retaining and pressing the stalks to the ground after they are broken by the front part of the breaker, which is set at an angle of about forty-five degrees. U is a bifurcated hook, pivoted to the tongue, and serves to gather the stalks under the breaker.

The machine operates as follows, viz: As the machine is drawn along, the hooks gather the stalks under the breaker, which presses them to the ground. The knife, descending, cuts the stalks. The swinging of the knife on the bars $l\ l$ allows the knife to swing backward as the machine is drawn forward, and when the knife is raised the spring throws the knife straight on the rods $m\ m$ until they strike the projections $n\ n$.

The arrangement of the bars $l\ l$, pitmen, and crank-rod gives the knife a draw cut as it is forced to the ground and through the stalks.

Having thus described our invention, what we claim as new, and desire to secure by Letters Patent, is—

1. The pivoted bars $l\ l$, in combination with the rods $m\ m$, knife M, pitmen $g\ g$, crank-rod D, pinion $d$, and cogged rim $c$, arranged so as to give the knife a draw cut, substantially as and for the purpose set forth.

2. The spring S, in combination with the knife M, bars $l\ l$, and projections $n\ n$, substantially as and for the purpose set forth.

3. The breaker T, constructed with the horizontal and angling pieces, as shown and described.

MILTON CLARK.
CHARLES A. HECKEL.

Witnesses:
 THEO. COLEMAN,
 CHAS. M. FLETCHER.